United States Patent [19]

Tezuka et al.

[11] Patent Number: 4,514,423
[45] Date of Patent: Apr. 30, 1985

[54] PROCESS OF PREPARING AN IMPROVED BUBBLE CHEWING GUM

[75] Inventors: Shichigoro Tezuka, Kawasaki; Yoshinori Sato, Niiza; Masaki Shibata, Tokyo; Nobuyuki Harikae, Funabashi, all of Japan

[73] Assignee: Lotte Co., Ltd., Tokyo, Japan

[21] Appl. No.: 576,761

[22] Filed: Feb. 1, 1984

Related U.S. Application Data

[63] Continuation of Ser. No. 266,434, May 22, 1981, abandoned.

[51] Int. Cl.³ .............................................. A23G 3/30
[52] U.S. Cl. .............................................. 426/3; 426/6
[58] Field of Search .................................... 426/3–6

[56] References Cited

U.S. PATENT DOCUMENTS

| | | | |
|---|---|---|---|
| 969,458 | 9/1910 | Buck | 426/3 |
| 1,786,831 | 12/1930 | Dellenberger | 426/3 |
| 1,975,447 | 10/1934 | Canning | 426/6 |
| 2,050,272 | 8/1936 | Canning | 426/6 |
| 2,087,900 | 7/1937 | Carmody | 426/6 |
| 2,224,637 | 12/1940 | Mahle | 426/3 |
| 2,273,425 | 2/1942 | Traylor | 426/4 |
| 2,306,415 | 12/1942 | Walker | 426/3 |
| 3,632,358 | 4/1968 | Echeandia | 426/3 |
| 3,984,574 | 10/1976 | Comollo | 426/4 |
| 4,000,321 | 12/1976 | Mochizuki et al. | 426/3 |
| 4,187,320 | 2/1980 | Koch et al. | 426/3 |
| 4,224,345 | 9/1980 | Tezuka et al. | 426/6 |
| 4,357,355 | 11/1982 | Koch et al. | 426/4 |

*Primary Examiner*—Jeanette Hunter
*Attorney, Agent, or Firm*—Young & Thompson

[57] ABSTRACT

A bubble gum having strengthened membrane forming properties wherein the base contains vinyl acetate resin filler emulsifiers, flavor color and fragrance and includes 2.5% to 15% by weight of a fat or oil ingredient, not less than 15% by weight of rubber and 15 to 17 parts by weight wax, said base being free of ester gum.

6 Claims, 3 Drawing Figures

PROCESS OF PREPARING AN IMPROVED BUBBLE CHEWING GUM

This application is a continuation of application Ser. No. 266,434, filed May 22, 1981, abandoned.

FIELD OF THE INVENTION

This invention relates to a process of preparing an improved bubble chewing gum and, more particularly, to a process of preparing an improved bubble chewing gum which utilizes a fat and oil ingredient instead of using an ester gum ingredient.

BACKGROUND OF THE INVENTION

Hitherto, in order to prepare a bubble chewing gum, there has been used an ester gum as a gum membrane strengthening agent for the gum base composition together with vinyl acetate resin, natural resin, synthetic rubber, wax, filler, emulsifier and others. These ingredients are always required, especially in the bubble chewing gum, for obtaining a suitable degree of hardness and inflatability. However, the ester gum ingredient has disadvantages of bitterness intrinsic to esters and non-compatibility to vinyl acetate resin which is an essential ingredient for the bubble chewing gum, for which reason use of the ester gum is limited to some extent, notwithstanding necessity of use of the ester gum for obtaining a film-forming property indispensable for the bubble chewing gum.

Now it has been found out that the ester gum with the foregoing disadvantages may be replaced by an appropriate amount of a fat and oil which performs functions of enhancing chewability, film-forming property, inflatability and others, thereby to provide an improved bubble chewing gum which is in no way inferior in any respect to the conventional bubble gum containing the ester gum.

It has also been found out that the fat and oil used in place of the ester gum is not necessarily incorporated into the gum base composition but a confectionery containing the fat and oil such as chocolate, ice cream or the like may be combined by means of scattering, coating or encapsulation with the bubble chewing gum prepared from the gum base with neither ester gum nor fat and oil, thereby to achieve a comparable effect which is very surprising fact in view of such a common knowledge that an addition of a fatty confectionery to the chewing gum deteriorates the quality, especially chewing property.

SUMMARY OF THE INVENTION

It is, therefore, a general object of the invention to provide a process of preparing an improved bubble chewing gum having comparable or superior quality to the conventional ones while eliminating the many disadvantages due to the ester gum as described hereinbefore.

According to the invention, the foregoing object of the invention may be achieved by incorporating a fat and oil ingredient into the bubble chewing gum while excluding an ester gum ingredient from the usual composition of the gum base for the bubble chewing gum.

The fat and oil ingredient may be incorporated into the bubble chewing gum either by addition to the composition of the gum base without the ester gum ingredient or by combination with the bubble chewing gum without the ester gum ingredient through technique of scattering, coating or encapsulation.

BRIEF DESCRIPTION OF THE INVENTION

FIGS. 1 to 3 show various structures of the bubble chewing gum prepared by the process according to the invention.

DETAILED DESCRIPTION OF THE INVENTION

Figure 1:
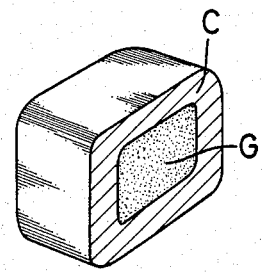

It has not yet been elucidated why the use of the fat and oil in place of the ester gum ingredient may bring about comparable or superior properties, such as chewability, film-forming property, film stability and inflatability, to those of the conventional bubble chewing gum containing the ester gum ingredient.

In any way, the incorporation of the fat and oil in place of the ester gum upon preparation of the gum base, upon preparation of the bubble chewing gum or upon finishing with a confectionery containing the fat and oil ingredient, such as chocolate, ice cream or the like may provide an improved bubble chewing gum.

Any naturally occurring edible fat and oil, such as cacao fat, palm oil and the like may be used in accordance with the invention. Alternatively, various confectioneries containing the fat and oil ingredients such as chocolate, ice cream, caramel and the like may be combined with the bubble chewing gum prepared from the gum base containing neither ester gum nor fat and oil ingredients or from the gum base containing the fat and oil excluding ester gum ingredient to achieve the comparable effect. While the fat and oil ingredient may be incorporated in any stage of the chewing gum production and by any means, it is preferred to add an ordinary fat and oil, such as cacao fat, palm or coconut oil to the composition of the gum base. In the latter case, it is desirable to increase the temperature of the batch above the boiling point of the fat and oil upon mixing in order to obtain a homogeneous blend.

An amount of the fat and oil to be added may be in the range of about 2.5% to 15% by weight based on the product bubble chewing gum. Outside the specified range, the function of the fat and oil is not obtainable or the quality of the bubble chewing gum goes down. The confectionery containing the fat and oil, such as chocolate, ice cream or the like may be used as the fat and oil ingredient as described hereinbefore. In this case, however, an amount of the confectionery to be used must be adjusted in such a manner that the amount of the fat and oil ingredient contained in the confectionery falls within the above-specified range. Thus, if the confectionery contains a too little ratio of the fat and oil ingredient, a large amount of the confectionery must be used. This is rather inconvenient for application to the process according to the invention. On the contrary, if the confectionery contains too large a ratio of the fat and oil ingredient the amount of the confectionery to be added must be correspondingly small, resulting in the bubble chewing gum incapable of having a specific desired characteristic (such as flavor and taste) of the confectionery. Accordingly, chocolate and ice cream may preferably be used as the confectioneries containing the fat and oil ingredient. For example, when the chocolate containing 30% by weight of the fat and oil ingredient is utilized, 65 to 55 parts of the chocolate may be combined with 35 to 45 parts by weight of the bubble chewing gum. When the ice cream containing 8% by weight of the fat and oil ingredient is utilized, then 70 to 60 parts of the ice cream may be combined with 30 to 40 parts by weight of the bubble chewing gum. The confectionery containing the fat and oil ingredient, such as chocolate, ice cream, caramel or the like, may be combined with the bubble chewing gum in any means, for example by coating the bubble chewing gum with the confectionery, by scattering small pieces of the bubble chewing gum into the confectionery (vice versa) or by encapsulating the confectionery within the bubble chewing gum.

In brief, as far as the suitable amount of the fat and oil ingredient is mixed with the bubble chewing gum upon chewing within the mouth, any type of incorporation procedure and any shape of incorporation structure may be employed.

The fat and oil ingredient may be combined with usual composition of the gum base excluding the ester gum ingredient, for example, with natural and synthetic resins (such as vinyl acetate resin), natural and synthetic rubbers, wax, emulsifier, filler and others.

In order to regulate the stiffness of the bubble chewing gum to a suitable degree and to avoid the melting phenomenon, however, it is preferred to add an increased amount of the rubber ingredient to the gum base depending on the amount of the fat and oil incorporated. In general, not less than about 15% of the rubber ingredient may be used in the improved bubble chewing gum according to the invention.

The improved bubble chewing gum according to the invention may bring the following advantages as examples:

(1) smooth feel upon chewing;
(2) non-stickiness to the teeth;
(3) absence of bitterness due to the ester gum;
(4) comparable or superior properties, such as chewability, film-forming property, film stability and inflatability to the conventional bubble chewing gum containing the ester gum ingredient;
(5) no degradation of the quality and the chewability of the bubble chewing gum despite of combination with the confectionery containing the fat and oil ingredient.

The invention will be illustrated by the following non-limitative example, wherein the percentages and parts are represented by weight unless otherwise noted.

EXAMPLE

The gum bases (A) to (D) for the bubble chewing gum were prepared by a conventional procedure, using the blending proportions as listed in Table 1. In the table, the gum base (A) was prepared by using the ester gum ingredient and therefore serves as the comparative example. Thereafter, these gum base were processed to various types of bubble chewing gum by kneading with the usual additives such as sweeteners, softeners and flavors, as listed in Table 1.

TABLE 1

| Ingredients | (A) Conventional Gum parts | (B) Improved Gum parts | (C) Gum for Chocolate Blending parts | (D) Gum for Ice Cream Blending parts |
|---|---|---|---|---|
| GUM BASE COMPOSITION | | | | |
| Natural Rubber | 1 | 2.5 | 2.6 | 2.5 |
| Synthetic Rubber | 12 | 19.0 | 21.0 | 20.0 |
| Vinyl Acetate Resin | 25 | 30.0 | 33.0 | 32.0 |
| Ester Gum | 21 | 0 | 0 | 0 |

TABLE 1-continued

| Ingredients | (A) Conventional Gum parts | (B) Improved Gum parts | (C) Gum for Chocolate Blending parts | (D) Gum for Ice Cream Blending parts |
|---|---|---|---|---|
| Wax | 14 | 15.0 | 17.0 | 16.0 |
| Mono-glyceride | 12 | 16.0 | 18.0 | 17.0 |
| Fat and Oil | 0 | 10.0 | 0 | 5.0 |
| Filler | 14 | 6.0 | 7.0 | 6.0 |
|  | ↓ | ↓ | ↓ | ↓ |
| BUBBLE CHEWING GUM COMPOSITION | | | | |
| Above Gum Base | 25 | 25 | 34 | 34 |
| Powdery Sugar | 30 | 30 | 18 | 18 |
| Glucose | 40 | 30 | 40 | 40 |
| Hydrolysate Syrup | 4 | 10 | 6 | 6 |
| Softener (Glycerine) | 0.5 | 0.5 | — | — |
| Flavor | 0.8 | 0.8 | 0.8 | 0.8 |

The conventional bubble chewing gum obtained by (A) was then combined with chocolate (fat and oil content of 30%) in the ratio of 60/40 (Gum/Chocolate) to prepare a chocolate bubble chewing gum. Similarly, the bubble chewing gum obtained by (C) was combined with chocolate (fat and oil content of 30%) in the same ratio (60/40) to prepare a chocolate bubble chewing gum.

Figure 2:
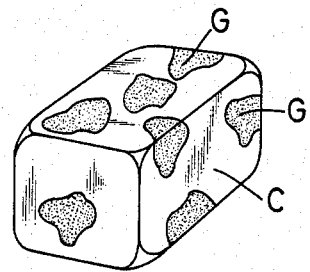
Figure 3:
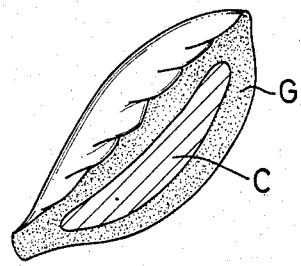

Upon combining the bubble chewing gum with chocolate, any technique, such as the coating of the gum (G) with chocolate (C) (FIG. 1), scattering of the gum pieces (G) into chocolate (C) (FIG. 2) (vice versa) or encapsulation of chocolate (C) within the gum (G) (FIG. 3) may be optionally selected.

The chocolate bubble chewing gums (A) and (C) thus prepared were then assessed by a panel consisting of 30 skilled persons to obtain the results as shown in Table 2.

TABLE 2

|  | (A) is better | (C) is better | No difference |
|---|---|---|---|
| Hardness upon chewing | 0 | 28 | 2 |
| Inflated Size | 9 | 7 | 14 |
| Inflated Stability | 15 | 10 | 5 |
| Taste | 2 | 23 | 5 |
| Easiness of Inflation | 3 | 21 | 6 |
| Feel upon Chewing | 11 | 16 | 3 |
| General Quality | 3 | 22 | 5 |

As apparent from the results shown in Table 2, the chocolate bubble chewing gum prepared in accordance with the invention (namely, using the fat and oil in place of the ester gum) is much superior in the general assessment to the conventional one containing the ester gum.

Similarly, the bubble chewing gums obtained by (A) and (D) were combined with ice cream (fat and oil content of 8%) in the ratio of 35/65 (Gum/Ice cream) to prepare the ice cream bubble chewing gums (A) and (D), respectively.

The ice cream bubble chewing gums (A) and (D) thus prepared were assessed by the panel consisting of 30 skilled persons to obtain the results as shown in Table 3.

TABLE 3

|  | (A) is better | (D) is better | No difference |
|---|---|---|---|
| Hardness upon Chewing in Cold | 0 | 30 | 0 |
| Inflated Size | 10 | 8 | 12 |
| Inflated Stability | 12 | 11 | 7 |

TABLE 3-continued

|  | (A) is better | (D) is better | No difference |
|---|---|---|---|
| Easiness of Inflation | 9 | 15 | 6 |
| General Feel | 8 | 20 | 2 |
| Taste | 8 | 19 | 3 |
| General Quality | 4 | 21 | 5 |

As apparent from the results shown in Table 3, the ice cream bubble chewing gum prepared in accordance with the invention (namely, containing the fat and oil ingredient as the ice cream without the ester gum) is much superior in the general assessment to the conventional one containing the ester gum.

What is claimed is:

1. In the process for preparing a bubble gum having strengthened membrane forming properties wherein a bubble gum base including vinyl acetate resin, filler, emulsifiers and flavor, color and fragrance additive is prepared, the improvement of forming said base free of an ester gum, and incorporating therewith a fat or oil ingredient in an amount of between 2.5% to 15% by weight of said product, rubber in an amount not less than 15% by weight of said product, and a wax in an amount of between 15 to 17 parts by weight of said product while maintaining said product free of any ester gum.

2. The process according to claim 1, wherein said fat or oil is incorporated into the gum base during preparation thereof.

3. The process according to claim 1, wherein at least some of said fat or oil ingredient is introduced as a confection combined with said bubble gum product, selected from the group consisting of chocolate and ice cream, and the total amount of said fat or oil ingredient in said confection and said bubble gum product is in an amount of between 2.5% to 15% by weight of said bubble gum product.

4. The process according to claim 3, wherein small pieces of said bubble gum product are scattered in a said confection.

5. The process according to claim 3, wherein said confection is encapsulated in said bubble gum product.

6. The process according to claim 3, wherein said bubble gum product is coated on said confection.

* * * * *